United States Patent
Bridges

(10) Patent No.: US 6,901,787 B2
(45) Date of Patent: Jun. 7, 2005

(54) METHOD OF TESTING THE PRESSURE INTEGRITY OF A TANK

(75) Inventor: Robert Bridges, Crowthorne (GB)

(73) Assignee: The Safe Group Limited, Crowthrone (GB)

( * ) Notice: Subject to any disclaimer, the term of this patent is extended or adjusted under 35 U.S.C. 154(b) by 0 days.

(21) Appl. No.: 10/362,545

(22) PCT Filed: Aug. 31, 2001

(86) PCT No.: PCT/GB01/03909
§ 371 (c)(1),
(2), (4) Date: Jun. 10, 2003

(87) PCT Pub. No.: WO02/18899
PCT Pub. Date: Mar. 7, 2002

(65) Prior Publication Data
US 2004/0035188 A1 Feb. 26, 2004

(30) Foreign Application Priority Data
Aug. 31, 2000 (GB) .............................. 0021435

(51) Int. Cl.$^7$ ................................ G01M 3/04
(52) U.S. Cl. ..................................... 73/49.2
(58) Field of Search .................. 73/49.2, 49.3

(56) References Cited

U.S. PATENT DOCUMENTS

| | | | |
|---|---|---|---|
| 3,377,844 A | * | 4/1968 | Gandolfo ................... 73/49.2 |
| 3,981,335 A | * | 9/1976 | Deters ......................... 141/46 |
| 4,442,702 A | * | 4/1984 | Sawada ...................... 73/49.2 |
| 4,896,530 A | * | 1/1990 | Lehmann ..................... 73/49.2 |
| 5,220,822 A | * | 6/1993 | Tuma ...................... 73/40.5 R |
| 5,375,455 A | * | 12/1994 | Maresca et al. ......... 73/40.5 R |
| 5,557,965 A | * | 9/1996 | Fiechtner .................... 73/49.2 |
| 5,568,449 A | * | 10/1996 | Rountree et al. ............. 367/99 |
| 5,668,308 A | * | 9/1997 | Denby ........................ 73/49.2 |
| 6,622,757 B2 | * | 9/2003 | Hart et al. ..................... 141/7 |

FOREIGN PATENT DOCUMENTS

JP 35086429 * 5/1983 ................ 73/49.2

* cited by examiner

Primary Examiner—Michael Cygan
(74) Attorney, Agent, or Firm—Stites & Harbison PLLC; Douglas E. Jackson

(57) ABSTRACT

A method of testing the pressure integrity of a tank containing hydrocarbon in liquid and gaseous phase and its associated pipework and valves, the tank having an inlet for the supply of liquid hydrocarbon to the tank, a first outlet for the removal of gaseous hydrocarbon from the tank, and a second outlet for the removal of liquid hydrocarbon from the tank; the method comprising the steps of closing in the inlet and first outlet and monitoring the pressure within the tank during normal operation of the tank as liquid hydrocarbon is removed from the second outlet.

5 Claims, 3 Drawing Sheets

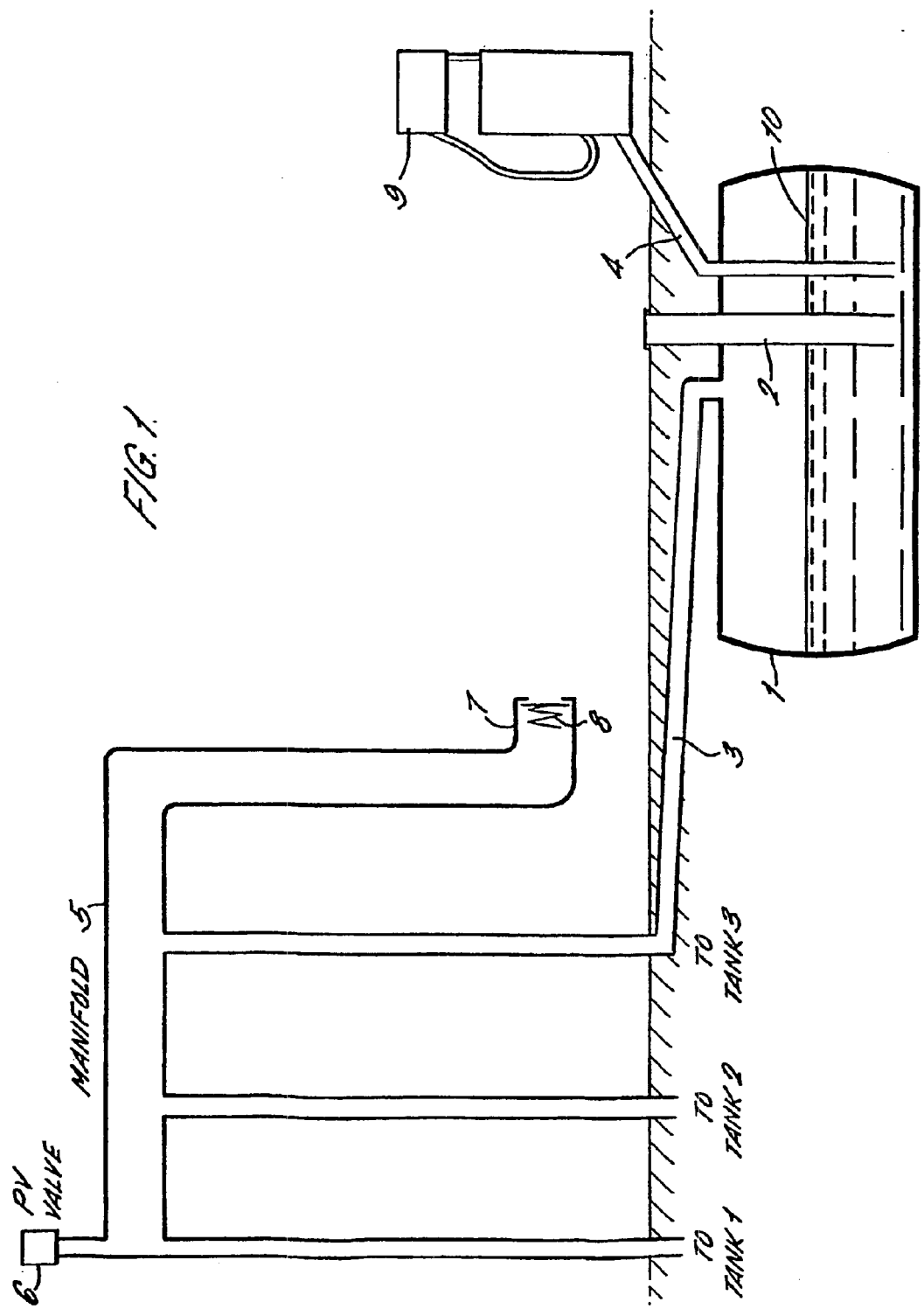

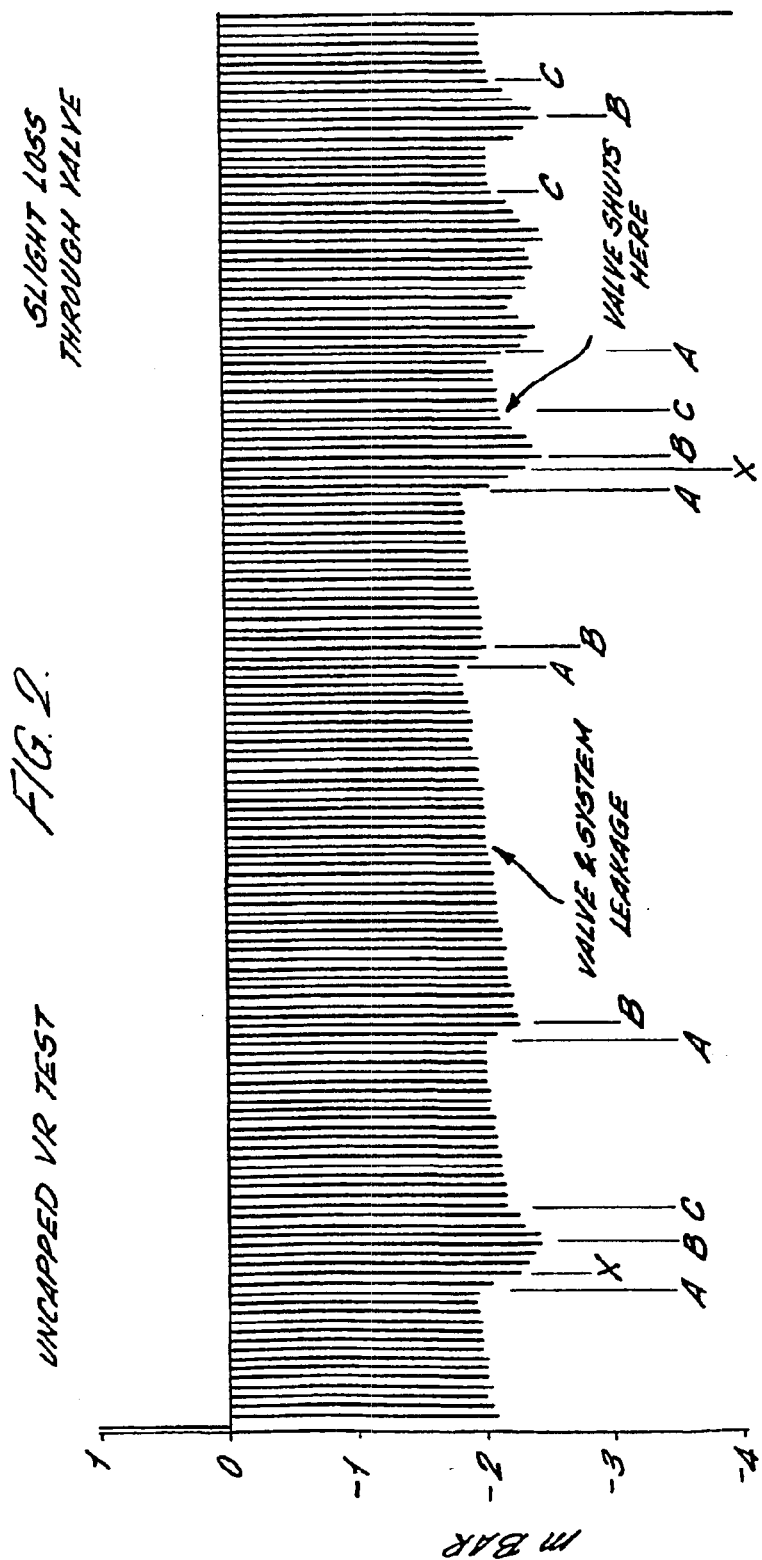

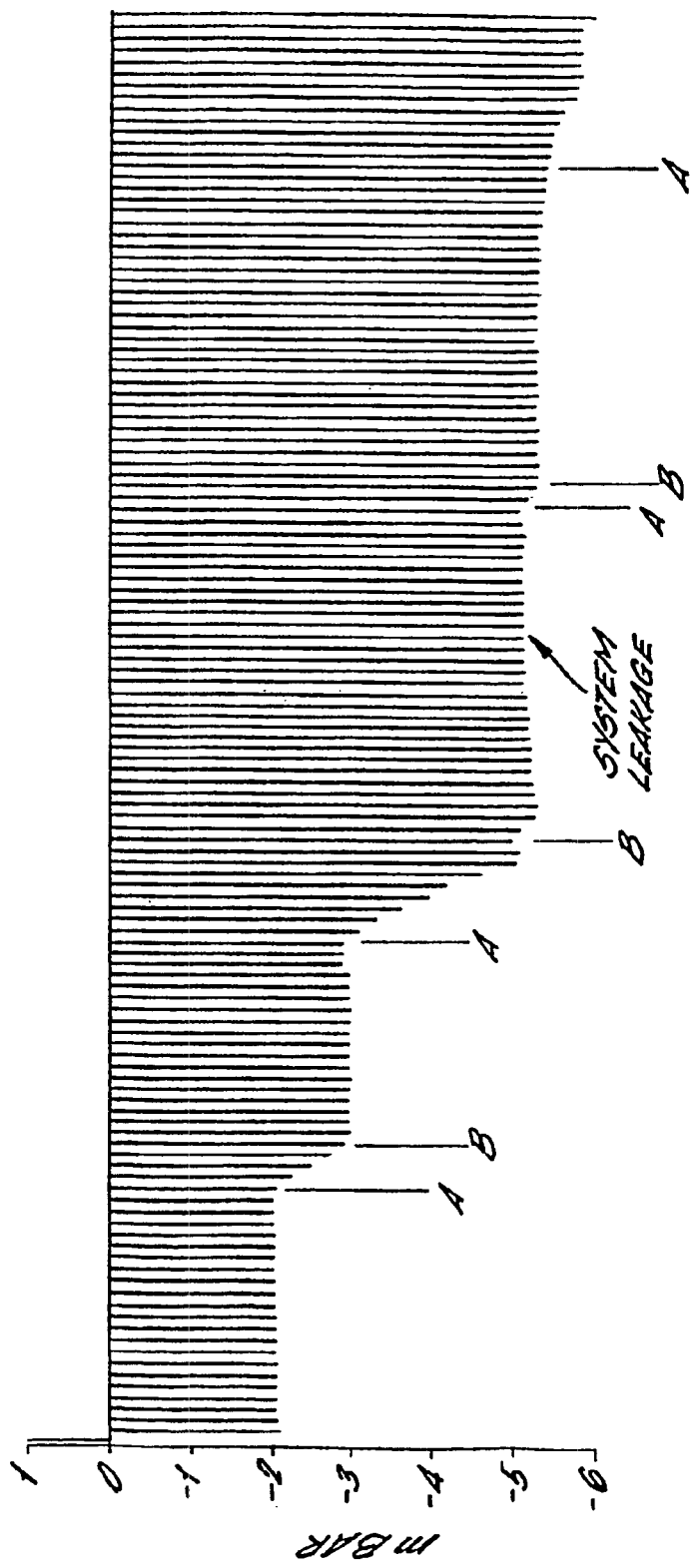

METHOD OF TESTING THE PRESSURE INTEGRITY OF A TANK

This application is a National stage Entry of PCT/GB01/03909, filed Aug. 31, 2001.

The present invention relates to a method of testing the pressure integrity of a tank and its associated pipework and valves containing a hydrocarbon in liquid and gaseous phase.

Such tanks are provided, usually underground, at filling stations and are supplied with a liquid hydrocarbon fuel from a tanker. The tanks are linked to a number of dispensing pumps from which the fuel is drawn by motorists.

The tanks contain vapour which is vented from the tank via a vapour return line to the delivery tanker which is simultaneously supplying liquid fuel to the tank. To prevent the vapour escaping to atmosphere, the vapour return line is fitted with a pressure/vacuum (P/V valve) which maintains a small backed pressure in the system. This, together with the small negative pressure in the tanker encourages vapour to flow back to the tanker. The recovered vapour is taken away by the tanker for recovery and re-use.

The tank and the associated system requires regular testing in order to detect any leaks from the tank, pipework or valves which may be causing an environmental hazzard. Conventionally, this is done by sealing off the system, including an outlet from the tank to the dispensing pumps and artificially raising or lowering the contained pressure and monitoring how this varies over time. In this case, sales of the product from the site need to be halted and the cost of testing becomes prohibitive discouraging environmental legislative compliance.

According to the present invention, there is provided a method of testing the pressure integrity of a tank containing hydrocarbon in liquid and gaseous phase and its associated pipework and valves, the tank having an inlet for the supply of liquid hydrocarbon to the tank, a first outlet for the removal of gaseous hydrocarbon from the tank, and a second outlet for the removal of liquid hydrocarbon from the tank; the method comprising the steps of closing the inlet and first outlet and monitoring the pressure within the tank during normal operation of the tank as liquid hydrocarbon is removed from the second outlet.

The present invention works on the principle that by observing a known amount of liquid fuel being withdrawn from the tank, it is possible to obtain certain diagnostic information about the state of the tank and its associated pipework and valves.

If the test is being carried out in relatively steady atmospheric conditions, it is possible to derive some diagnostic information from the pressure within the tank alone. However, generally, it is preferable also to monitor atmospheric conditions and to compensate the pressure within the tank to account for changes in atmospheric conditions.

The method can be used to determine the presence of a leak from the system as a whole. However, by isolating part of the tank and its associated pipework and valves and conducting a further test, more information about the location of the leak can be obtained. The results of this test are preferably compared with the results of the test on the overall system. Thus, if a valve is suspected of leaking, or if a leak is discovered in some other part of the system, this part of the system can be isolated and the test can be conducted on the remainder of the system to determine whether the remainder of the system now retains its pressure integrity.

A recent development is the introduction in certain filling stations of vapour recovery pumps. These collect vapour from the vehicle fuel tank and pump it back into the underground storage tank. Such an arrangement distorts the readings from the above mentioned method. Under these circumstances, preferably, the method further comprises disabling or blocking the vapour recovery pump prior to the monitoring step. Thus, the method is carried out without the vapour recovery pumps distorting the readings.

A problem with the vapour recovery pumps is that the pressure reduction in the tank caused by the removal of the liquid hydrocarbon and the pressure increase within the tank caused by the vapour recovery are never in perfect balance. If the depletion effect of the hydrocarbon removal is dominant, the pressure in the tank will reduce until the lower limit of the P/V valve is reached. Each further sale will then result in air being drawn into the tank through the P/V valve. If, on the other hand, the increase in pressure caused by the vapour recovery pumps is dominant, pressure within the tank will increase until the upper limit of the P/V valve is reached. Each further sale under these circumstances will cause enriched vapour to be released into the atmosphere. Therefore, it is desirable for the vapour recovery pumps to be set to deliver less positive pressure into the tank than the negative effect caused by the removal of the liquid hydrogen. Thus, the method preferably comprises disabling or blocking all but one of the pumps in turn during the monitoring step. By doing this, it is possible to establish for each hose a balance between the negative effect of the liquid hydrocarbon removal and the positive effect of the vapour recovery. The vapour recovery pump will then be set accordingly.

A method in accordance with the present invention will now be described with reference to the accompany drawings, in which:

FIG. 1 is a schematic representation of a system to which the method is applicable;

FIG. 2 is a graph showing the pressure monitored with the P/V valve uncovered; and FIG. 3 is a graph similar to FIG. 2 but showing pressure changes with the P/V valve covered.

FIG. 1 represents a typical filling station. Fuel of various different grades is stored in underground tanks 1 only one of which is shown in FIG. 1. Each tank has its own fuel supply line 2, vapour recovery line 3 and fuel outlet line 4. Each vapour recovery line 3 is connected to a common manifold 5, the pressure of which is controlled by a pressure/vacuum (P/V) valve 6. The manifold 5 has an outlet 7 which is normally closed by valve 8. The fuel outlet lines 4 from the tanks 1 are connected to dispensing pumps 9 allowing a motorist to obtain fuel from several different tanks.

In order to fill a tank 1, a delivery tanker is connected to the fuel inlet line 2 and to the outlet 7 of the manifold 5, in the process opening the valve 8. Fuel is then pumped into the tank 1 raising the liquid level 10 with the tank and driving the vapour along the vapour recovery line 3 into manifold 5 and back into a vapour space in the tanker.

Leakage may occur from the system either through the walls of the tank 1 or the associated pipework 3,5 or the valves 6,8.

The present invention monitors the pressure without a delivery tanker being present and with the system operating normally to deliver fuel to the pumps 9. Under these circumstances, the fuel delivery line 2 is closed and a pressure gauge is applied to the outlet 7 of the manifold 5. The pressure gauge will open the valve 8, but will itself seal the outlet 7 of the manifold 5 so that there is no flow of vapour out of the manifold. Typical readings from the pressure gauge are shown in FIGS. 2 and 3. In these graphs, the following labelling is used:

A. Vehicle starts to draw fuel
B. Vehicle stops during fuel
X. P/V valve opens near design pressure
C. P/V valve closes near design pressure Referring first to FIG. 2 as a motorist draws fuel through a pump 9, the pressure in the system drops, as demonstrated by the downward slope from A to B in FIG. 2. If the pressure drops below a certain level, the P/V valve opens as indicated at X in FIG. 2 to allow air into the manifold 5. Once the motorist stops drawing fuel, the pressure rises due to the flow of air through the P/V valve 6 as indicated by the upward slope from B to C. Once the pressure has reached a certain level at C the P/V valve closes. From this point on, the pressure should remain constant until fuel is again drawn from pump 9. However, as can be seen in FIG. 2, the pressure rises gradually prior to the next amount of fuel being drawn. This indicates the presence of a leak in the system. However, it is not apparent from FIG. 2 alone what the source of this leak is.

In order to obtain further information about this, the test is then repeated with the P/V valve covered to produce the results shown in FIG. 3. Again, the pressure drops from A to B as fuel is drawn from the tank. However, under these circumstances, there is only a very gradual rise in the pressure from B to A while fuel is not being drawn. This indicates that the majority of the leakage was occurring through the valve. However, the gradual increase indicates that there is still some leakage through the system. In the FIG. 3 as the P/V valve is covered, the pressure continues to drop as further fuel is drawn from the tank as pressure relief through the P/V valve is not available.

What is claimed is:

1. A method of testing the pressure integrity of a tank containing hydrocarbon in liquid and gaseous phase and its associated pipework and valves, the tank having an inlet for the supply of liquid hydrocarbon to the tank, a first outlet for the removal of gaseous hydrocarbon from the tank, and a second outlet for the removal of liquid hydrocarbon from the tank to dispensing pumps from which liquid hydrocarbon is drawn, in use, by motorists; the method comprising the steps of: closing the inlet and first outlet, and monitoring the pressure within the tank during normal operation of the tank as liquid hydrocarbon is removed from the second outlet to the dispensing pumps.

2. A method according to claim 1, further comprising the step of monitoring atmospheric conditions and compensating the pressure within the tank to allow for changes in atmospheric conditions.

3. A method according to claim 1, further comprising the step of isolating part of the tank and its associated pipework and valves and conducting a further test.

4. A method according to claim 1, wherein a vapour recovery pump is provided to recover vapour from vehicle tanks which are being filled with liquid hydrocarbon by the second outlet, the method comprising disabling or blocking the pour recovery pump prior to the monitoring step.

5. A method according to claim 4, wherein a plurality of second outlets are provided and a vapour recovery pump is associated with each outlet, the method comprising disabling or blocking all but one of the pumps in turn during the monitoring step.

* * * * *